(12) United States Patent
Yang et al.

(10) Patent No.: US 7,835,587 B2
(45) Date of Patent: Nov. 16, 2010

(54) METHOD AND APPARATUS FOR LOCAL STANDARD DEVIATION BASED HISTOGRAM EQUALIZATION FOR ADAPTIVE CONTRAST ENHANCEMENT

(75) Inventors: Shengqi Yang, Chandler, AZ (US); Tiehan Lu, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1002 days.

(21) Appl. No.: 11/611,959

(22) Filed: Dec. 18, 2006

(65) Prior Publication Data

US 2008/0144931 A1 Jun. 19, 2008

(51) Int. Cl.
*G06K 9/38* (2006.01)
(52) U.S. Cl. .................. 382/270; 382/128; 382/224
(58) Field of Classification Search ......... 382/128–134, 382/224–228, 270–275
See application file for complete search history.

(56) References Cited

U.S. PATENT DOCUMENTS

| | | | | |
|---|---|---|---|---|
| 5,999,639 A | * | 12/1999 | Rogers et al. | 382/132 |
| 6,091,841 A | * | 7/2000 | Rogers et al. | 382/132 |
| 6,115,488 A | * | 9/2000 | Rogers et al. | 382/132 |
| 6,137,898 A | * | 10/2000 | Broussard et al. | 382/132 |
| 6,154,560 A | * | 11/2000 | Cothren et al. | 382/128 |
| 6,549,646 B1 | * | 4/2003 | Yeh et al. | 382/132 |
| 6,650,766 B1 | * | 11/2003 | Rogers et al. | 382/132 |
| 6,711,303 B1 | * | 3/2004 | Honsinger | 382/289 |
| 2007/0025633 A1 | * | 2/2007 | Srinivasa | 382/254 |

OTHER PUBLICATIONS

Ji, L T., et al., "Adaptive Image Contrast Enhancement Based on Human Visual Properties", IEEE Transactions on Medical Imaging, vol. 13, No. 4,, (Dec. 1994),573-586.

Joung, Youn K., et al., "An Advanced Contrast Enhancement Using Partially Overlapped Sub-Block Histogram Equalization", IEEE Transactions on Circuits and Systems for Video Technology, vol. 11, No. 4,, (Apr. 2001),475-484.

* cited by examiner

*Primary Examiner*—Manav Seth
(74) *Attorney, Agent, or Firm*—Kacvinsky Daisak PLLC

(57) ABSTRACT

Various embodiments for image contrast enhancement are described. In one or more embodiments, adaptive contrast enhancement may be realized by performing local standard deviation (LSD) based histogram equalization. In such embodiments, luminance (Y) values of an image may be grouped into one of several luminance regions, with each luminance region defining an LSD threshold. An LSD value may be calculated for each pixel within a particular luminance region and then compared to the LSD threshold for the particular luminance region. If the calculated LSD value for a pixel is smaller that the defined LSD threshold, then the pixel is not counted as a population for histogram equalization calculation. Otherwise, the pixel is counted as one population. Other embodiments are described and claimed.

28 Claims, 6 Drawing Sheets

(A)

(B)

(A)

(B)

(A)

(B)

(A)

(B)

METHOD AND APPARATUS FOR LOCAL STANDARD DEVIATION BASED HISTOGRAM EQUALIZATION FOR ADAPTIVE CONTRAST ENHANCEMENT

BACKGROUND

Image contrast enhancement is one of the major issues in video processing. Contrast enhancement can be achieved by stretching the dynamic range of important objects in an image. There are many algorithms for contrast enhancement and among these, linear contrast stretching and histogram equalization are two widely utilized methods for global image enhancement. Although these global methods are simple, they do not take into account local details and have undesired effect of overemphasizing noise. Adaptive histogram equalization and adaptive contrast enhancement are two well-known local enhancement methods. However, these local methods generate undesirable blackness.

DETAILED DESCRIPTION

Various embodiments for image contrast enhancement are described. In one or more embodiments, adaptive contrast enhancement may be realized by performing local standard deviation (LSD) based histogram equalization. In such embodiments, luminance (Y) values of an image may be grouped into one of several luminance regions, with each luminance region defining an LSD threshold. An LSD value may be calculated for each pixel within a particular luminance region and then compared to the LSD threshold for the particular luminance region. If the calculated LSD value for a pixel is smaller that the defined LSD threshold, then the pixel is not counted as a population for histogram equalization calculation. Otherwise, the pixel is counted as one population. The rationale for excluding certain pixels from histogram equalization calculation relies on the fact that if there is no big luminance difference within a small neighborhood, no contrast stretching is needed. It can be appreciated that this in contrast to traditional techniques for performing histogram equalization which counts each pixel as one population in the corresponding luminance level.

In various implementations, population information may be stored in a first array (e.g., 16-entry array) of a lookup table built for luminance value mapping. The first array may be interpolated to generate a second array (e.g., 256-entry array) used to perform luminance value mapping. Luminance values may be assigned to the pixels in the original image based on the luminance values included in the second array to output an enhanced image which realizes significant contrast enhancement with respect to the original image.

Figure 1:
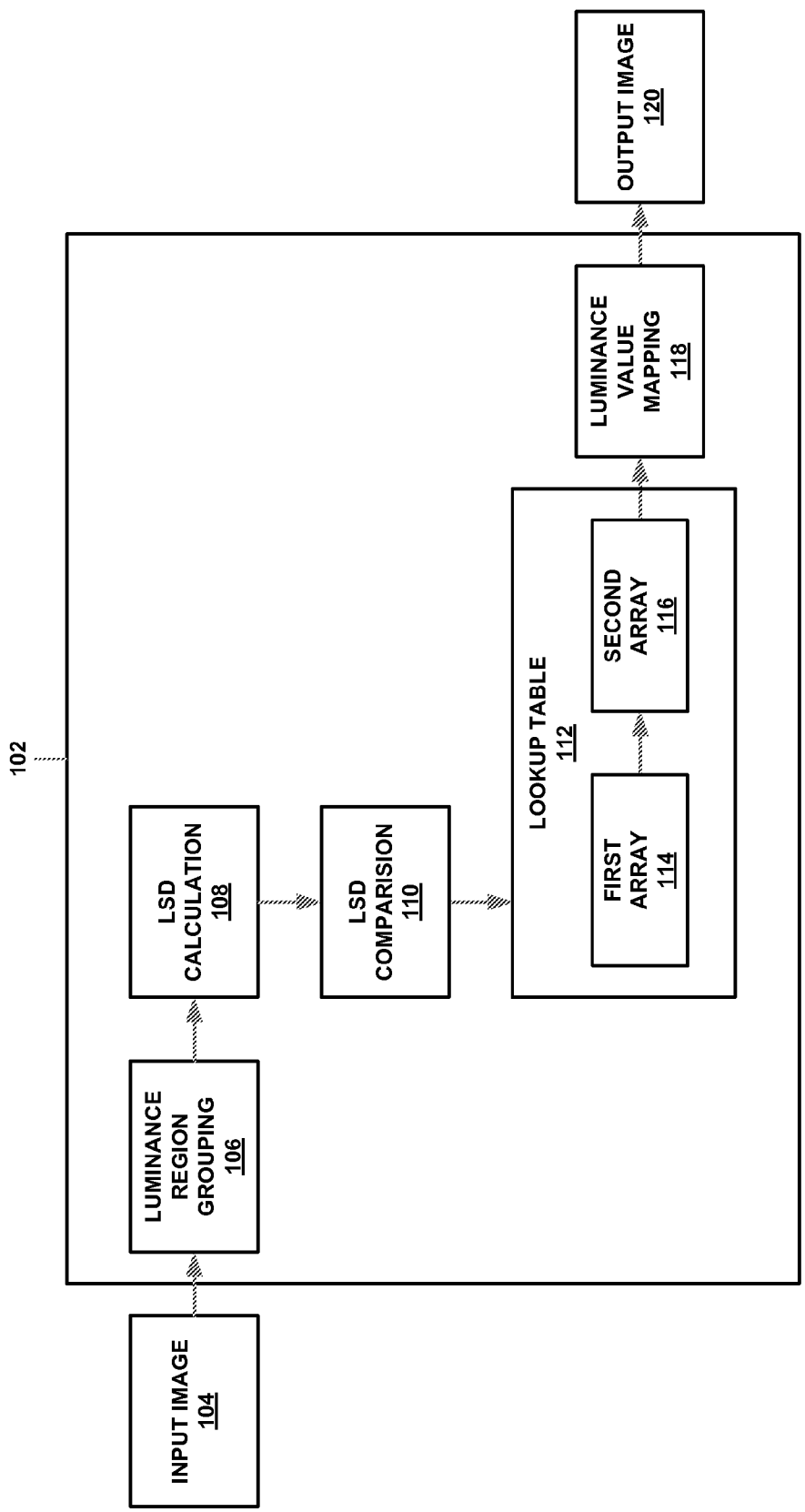
FIG. 1 illustrates a media system in accordance with one or more embodiments.

FIG. 1 illustrates a block diagram of a media system 100 in accordance with one or more embodiments. In general, the media system 100 may comprise various physical and/or logical components for communicating information which may be implemented as hardware, software, or any combination thereof, as desired for a given set of design parameters or performance constraints. Although FIG. 1 may show a limited number of components by way of example, it can be appreciated that a greater or a fewer number of components may be employed for a given implementation.

In various embodiments, the media system 100 may be implemented for a PC, CE, and/or mobile platform as a system within and/or connected to a device such as personal computer (PC), set-top box (STB), television (TV) device, Internet Protocol TV (IPTV) device, media player, and/or smart phone. Other examples of such devices may include, without limitation, a workstation, terminal, server, media appliance, audio/video (A/V) receiver, digital music player, entertainment system, digital TV (DTV) device, high-definition TV (HDTV) device, direct broadcast satellite TV (DBS) device, video on-demand (VOD) device, Web TV device, digital video recorder (DVR) device, digital versatile disc (DVD) device, high-definition DVD (HD-DVD) device, Blu-ray disc (BD) device, video home system (VHS) device, digital VHS device, a digital camera, a gaming console, display device, notebook PC, a laptop computer, portable computer, handheld computer, personal digital assistant (PDA), voice over IP (VoIP) device, cellular telephone, combination cellular telephone/PDA, pager, messaging device, wireless access point (AP), wireless client device, wireless station (STA), base station (BS), subscriber station (SS), mobile subscriber center (MSC), mobile unit, and so forth.

In mobile applications, for example, the media system 100 may be implemented within and/or connected to a device comprising one more interfaces and/or components for wireless communication such as one or more transmitters, receivers, transceivers, chipsets, amplifiers, filters, control logic, network interface cards (NICs), antennas, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, the media system 100 may form part of a wired communications system, a wireless communications system, or a combination of both. For example, the media system 100 may be arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The media system 100 also may be arranged to communicate information over one or more types of wireless communication links. Examples of a wireless communication link may include, without limitation, a radio channel, satellite channel, television channel, broadcast channel infrared channel, radio-frequency (RF) channel, Wireless Fidelity (WiFi) channel, a portion of the RF spectrum, and/or one or more licensed or license-free frequency bands. Although certain embodiments may be illustrated using a particular communications media by way of example, it may be appreciated that the principles and techniques discussed herein may be implemented using various communication media and accompanying technology.

In various embodiments, the media system 100 may be arranged to operate within a network, such as a Wide Area Network (WAN), Local Area Network (LAN), Metropolitan Area Network (MAN), wireless WAN (WWAN), wireless LAN (WLAN), wireless MAN (WMAN), wireless personal area network (WPAN), Worldwide Interoperability for Microwave Access (WiMAX) network, broadband wireless access (BWA) network, the Internet, the World Wide Web, telephone network, radio network, television network, cable network, satellite network such as a direct broadcast satellite (DBS) network, Code Division Multiple Access (CDMA) network, third generation (3G) network such as Wide-band CDMA (WCDMA), fourth generation (4G) network, Time Division Multiple Access (TDMA) network, Extended-TDMA (E-TDMA) cellular radiotelephone network, Global System for Mobile Communications (GSM) network, GSM with General Packet Radio Service (GPRS) systems (GSM/GPRS) network, Synchronous Division Multiple Access (SDMA) network, Time Division Synchronous CDMA (TD-SCDMA) network, Orthogonal Frequency Division Multiplexing (OFDM) network, Orthogonal Frequency Division Multiple Access (OFDMA) network, North American Digital Cellular (NADC) cellular radiotelephone network, Narrowband Advanced Mobile Phone Service (NAMPS) network, Universal Mobile Telephone System (UMTS) network, and/or any other wired or wireless communications network configured to carry data in accordance with the described embodiments.

The media system 100 may be arranged to communicate one or more types of information, such as media information and control information. Media information generally may refer to any data representing content meant for a user, such as image information, video information, audio information, A/V information, graphical information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The media and control information may be communicated from and to a number of different devices or networks.

In various implementations, the media information and control information may be segmented into a series of packets. Each packet may comprise, for example, a discrete data set having a fixed or varying size represented in terms of bits or bytes. It can be appreciated that the described embodiments are applicable to any type of communication content or format, such as packets, frames, fragments, cells, windows, units, and so forth.

The media system 100 may communicate information in accordance with one or more protocols. A protocol may comprise a set of predefined rules or instructions for managing communication among nodes. In various embodiments, for example, the media system 100 may employ one or more protocols such as medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

The media system 100 may communicate information in accordance with one or more standards as promulgated by a standards organization, such as the International Telecommunications Union (ITU), the International Organization for Standardization (ISO), the International Electrotechnical Commission (IEC), the Institute of Electrical and Electronics Engineers (IEEE), the Internet Engineering Task Force (IETF), and so forth. In various embodiments, for example, the media system 100 may communicate information according to media processing standards such as, for example, the ITU/IEC H.263 standard (Video Coding for Low Bitrate Communication, ITU-T Recommendation H.263v3, published November 2000), the ITU/IEC H.264 standard (Video Coding for Very Low Bit Rate Communication, ITU-T Recommendation H.264, published May 2003), Motion Picture Experts Group (MPEG) standards (e.g., MPEG-1, MPEG-2, MPEG-4), Digital Video Broadcasting (DVB) terrestrial (DVB-T) standards, DVB satellite (DVB-S or -S2) standards, DVB cable (DVB-C) standards, DVB terrestrial for handhelds (DVB-H), National Television System Committee (NTSC) and Phase Alteration by Line (PAL) standards, Advanced Television Systems Committee (ATSC) standards, Society of Motion Picture and Television Engineers (SMPTE) standards such as the SMPTE 421M or VC-1 standard based on Windows Media Video (WMV) version 9, Digital Transmission Content Protection over Internet Protocol (DTCP-IP) standards, High performance radio Local Area Network (HiperLAN) standards, and so forth.

In various embodiments, the media system 100 may be arranged to receive media content from a media source. The media source generally may comprise various devices and/or systems capable of delivering static or dynamic media content to the media system 100. In one embodiment, for example, the media source may comprise a multimedia server arranged to provide broadcast or streaming media content. In other embodiments, the media source may comprise or form part of a media distribution system (DS) or broadcast system such as an over-the-air (OTA) broadcast system, DVB system, radio broadcast system, satellite broadcast system, and so forth. The media source may be implemented within a VOD system or interactive television system that allows users to select, receive, and view video content over a network. The media source also may comprise or form part of an IPTV system that delivers digital television content over an IP connection, such as a broadband connection. The embodiments are not limited in this context.

The media system 100 may be coupled to the media source through various types of communication channels capable of carrying information signals such as wired communication links, wireless communication links, or a combination of both, as desired for a given implementation. The media system 100 also may be arranged to receive media content from the media source through various types of components or interfaces. For example, the media system 100 may be arranged to receive media content through one or more tuners and/or interfaces such as an OpenCable (OC) tuner, NTSC/PAL tuner, tuner/demodulator, point-of-deployment (POD)/DVB common interface (DVB-CI), A/V decoder interface, Ethernet interface, PCI interface, and so forth.

The media content delivered to the media system 100 may comprise various types of information such as image information, audio information, video information, A/V information, and/or other data. In some implementations, the media source may be arranged to deliver media content in various formats for use by a device such as an STB, IPTV device, VOD device, media player, and so forth.

The media content may be delivered as compressed media content to allow the media system 100 to efficiently store and/or transfer data. In various implementations, the media content may be compressed by employing techniques such as spatial compression using discrete cosine transform (DCT), temporal compression, motion compensation, and quantization. Video compression of the media content may be performed, for example, in accordance with standards such as H.264, MPEG-2, MPEG-4, VC-1, and so forth.

As shown in FIG. 1, the media system 100 may comprise a contrast enhancement apparatus 102. In various embodiments, the contrast enhancement apparatus 102 may be arranged to perform local standard deviation (LSD) based histogram equalization for adaptive contrast enhancement of an input image 104. The input image 104 may comprise data derived from or associated with one or more video images. For example, the input image 104 may comprise one or more of image data, video data, video sequences, groups of pictures, pictures, images, regions, objects, frames, slices, macroblocks, blocks, pixels, signals (e.g., Y, U, and V), and so forth. The values assigned to pixels may comprise real numbers and/or integer numbers. In one or more embodiments, the input image 104 may comprise luminance (Y) values for a plurality of pixels.

As illustrated, the contrast enhancement apparatus 102 may comprise a plurality of functional units or modules. In some embodiments, the plurality of modules may be implemented as a system-on-a-chip (SOC) by a single chip or integrated circuit (IC). The IC may include, for example, conductive traces, via structures, and/or one or more laminates fabricated by processes such as etching, bonding, drilling, and plating. In some implementations, the IC may comprise a flexible material, such as a flexible printed circuit (FPC).

In various embodiments, a functional unit or module may comprise hardware and/or software for performing one or more operations for the media system 100. A module may be implemented, for example, by various logic devices such as a central processing unit (CPU), microcontroller, microprocessor, general purpose processor, dedicated processor, chip multiprocessor (CMP), media processor, digital signal processor (DSP), network processor, co-processor, input/output (I/O) processor, application specific integrated circuit (ASIC), field programmable gate array (FPGA), programmable logic device (PLD), and so forth. In various implementations, a module may be arranged to execute logic implemented as software, code, and/or firmware. A module also may comprise memory implemented by one or more types of computer-readable storage media such as volatile or non-volatile memory, removable or non-removable memory, erasable or non-erasable memory, writeable or re-writeable memory, and so forth.

The contrast enhancement apparatus 102 may comprise a luminance region grouping module 106. In one or more embodiments, the luminance region grouping module 106 may be arranged to receive the input image 104 and to group the luminance (Y) values of the pixels of the input image 104 into one of several luminance regions. For example, the luminance (Y) values in the input image 104 may be grouped into three luminance regions comprising a lower luminance region (e.g., Y<=50), a medium luminance region (e.g., Y>50 and Y<=150), and high luminance region (e.g., Y>150). Accordingly, the luminance region grouping module 106 may be arranged to provide several luminance regions, with each particular luminance region comprising only those pixels having certain luminance values. In various implementations, an LSD threshold may be defined for each luminance region.

The contrast enhancement apparatus 102 may comprise an LSD calculation module 108. In one or more embodiments, the LSD calculation module 108 may be arranged to calculate an LSD value for each pixel within each luminance region. For example, an LSD value may be calculated for each pixel within a small window of each region, such as within a 3 by 3 window.

The contrast enhancement apparatus 102 may comprise an LSD comparison module 110. In one or more embodiments, the LSD comparison module 110 may be arranged to determine whether the calculated LSD value for a pixel, which belongs to a particular one of the several (e.g., three) luminance regions, is smaller than the corresponding LSD threshold defined for that particular luminance region. If the calculated LSD value for a pixel is smaller that the defined LSD threshold, then the pixel is not counted as a population for histogram equalization calculation. Otherwise, the pixel is counted as one population. The rationale for excluding certain pixels from histogram equalization calculation relies on the fact that if there is no big luminance difference within a small neighborhood, no contrast stretching is needed. It can be appreciated that this in contrast to traditional techniques for performing histogram equalization which counts each pixel as one population in the corresponding luminance level.

The LSD comparison module 110 may be arranged to store population information a lookup table 112 built for luminance value mapping. The lookup table 112 may comprise any type of data structure (e.g., array, file, table, record) and may be implemented by various types of storage media. In one or more embodiments the lookup table 112 may comprise a first array 114 and a second array 116. In various implementations, the first array 114 may comprise a 16-entry array which is generated when the lookup table 112 is built to collect the population information. Then, interpolation of the first array 114 may be performed to generate the second array 116, which may comprise a 256-entry lookup table.

The contrast enhancement apparatus 102 may comprise a luminance value mapping module 118. In one or more embodiments, the luminance value mapping module 118 may be arranged to assign new luminance values to the pixels in the input image 104 based on the luminance values included in the second array 116 of the lookup table 112. For example, the luminance values of the input image 104 may be used as an index and mapped to the second array 116 (e.g., 256-entry array) to generate new luminance values for the pixels of the input image 104. Accordingly, the luminance value mapping module 118 may be arranged to provide an enhanced output image 120 which may realize significant contrast enhancement with respect to the input image 104.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

Figure 2:
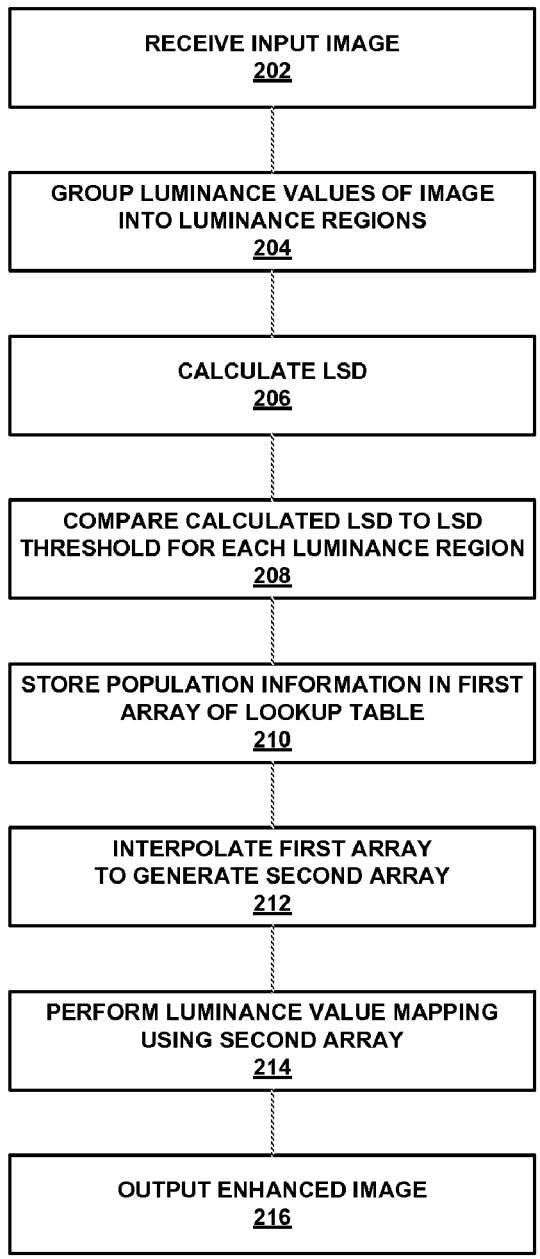
FIG. 2 illustrates a logic flow for contrast enhancement in accordance with one or more embodiments.

FIG. 2 illustrates a logic flow 200 for contrast enhancement in accordance with one or more embodiments. In various embodiments, the logic flow 200 may be performed by various systems, devices, units, and/or components and may be implemented as hardware, software, and/or any combination thereof, as desired for a given set of design parameters or performance constraints. The logic flow 200 may be implemented, for example, by one or more elements of the media system 100 illustrated in FIG. 1. For purposes of illustration, and not limitation, the logic flow 200 is described with reference to FIG. 1. The embodiments, however, are not limited in this context.

The logic flow 200 may comprise receiving an input image (block 202) and grouping luminance values of an image into luminance regions (block 204). The input image 104 may comprise data derived from or associated with one or more video images. In one or more embodiments, the input image 104 may comprise luminance (Y) values for a plurality of pixels. The luminance (Y) values of the input image 104 may be grouped into one of several luminance regions. For example, the luminance (Y) values in the input image 104 may be grouped into three luminance regions comprising a lower luminance region (e.g., Y<=50), a medium luminance region (e.g., Y>50 and Y<=150), and high luminance region (e.g., Y>150). Accordingly, each particular luminance region may comprise only those pixels having certain luminance values. In various implementations, an LSD threshold may be defined for each luminance region.

The logic flow 200 may comprise calculating an LSD value (block 206) and comparing a calculated LSD value to an LSD threshold for each luminance region (block 208). In one or more embodiments, an LSD value may be calculated for each pixel within each luminance region. For example, an LSD value may be calculated for each pixel within a small window (e.g., 3×3 window) of each region. A determination then is made whether the calculated LSD value for a pixel, which belongs to a particular one of the several (e.g., three) luminance regions, is smaller than the corresponding LSD threshold defined for that particular luminance region. If the calculated LSD value for a pixel is smaller that the defined LSD threshold, then the pixel is not counted as a population for histogram equalization calculation. Otherwise, the pixel is counted as one population.

The logic flow 200 may comprise storing population information in a first array of a lookup table (block 210) and interpolating the first array to generate a second array (block 212). In one or more embodiments, population information may be stored a lookup table 112 built for luminance value mapping. The lookup table 112 may comprise a first array 114 and a second array 116. In various implementations, the first array 114 may comprise a 16-entry array which is generated when the lookup table 112 is built to collect the population information. The first array 114 may be interpolated to generate the second array 116, which may comprise a 256-entry lookup table.

The logic flow 200 may comprise performing luminance value mapping using the second array (block 214) and outputting an enhanced image (block 216). In one or more embodiments, luminance values may be assigned to the pixels in the input image 104 based on the luminance values included in the second array 116 of the lookup table 112. For example, the luminance values of the input image 104 may be used as an index and mapped to the second array 116 (e.g., 256-entry array) to generate new luminance values for the pixels of the input image 104. Accordingly, an output image 120 may be provided which realizes significant contrast enhancement with respect to the input image 104.

One embodiment of an algorithm or pseudo code for contrast enhancement is as follows:

```
Define a 16-entry lookup table
For each pixel in an image
    Calculate the LSD of the pixel luminance value
    If (pixel falls in the first region and LSD is greater than the threshold
        defined for this region )
    {
        Add this pixel as a population in the 16-entry lookup table
    }
    Else If (pixel falls in the second region and LSD is greater than the
        threshold defined for this region)
    {
        Add this pixel as a population in the 16-entry lookup table
    }
    Else If (pixel falls in the third region and LSD is greater than the
        threshold defined for this region)
    {
        Add this pixel as a population in the 16-entry lookup table
    }
End For
Interpolate and generate the 256-entry lookup table
Do the luminance mapping for the original image
Output the enhanced image
```

Figure 3:
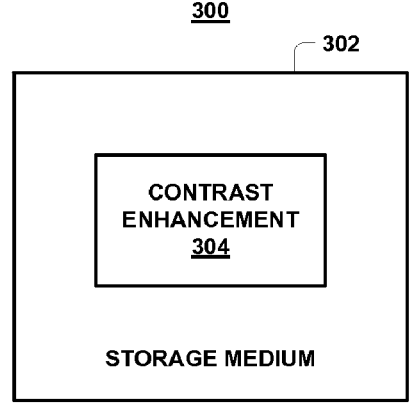
FIG. 3 illustrates an article of manufacture comprising contrast enhancement logic in accordance with one or more embodiments.

FIG. 3 illustrates one embodiment of an article of manufacture 300. As shown, the article 300 may comprise a storage medium 302 to store contrast enhancement logic 304 for performing various operations in accordance with the described embodiments. In various embodiments, the article 300 may be implemented by various systems, components, and/or modules.

The article 300 and/or storage medium 302 may include one or more types of computer-readable storage media capable of storing data, including volatile memory or, non-volatile memory, removable or non-removable memory, erasable or non-erasable memory, writeable or re-writeable memory, and so forth. Examples of a computer-readable storage medium may include, without limitation, random-access memory (RAM), Dynamic RAM (DRAM), Synchronous DRAM (SDRAM), Double-Data-Rate RAM (DDR RAM), DDR SDRAM, static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other type of computer-readable storage media suitable for storing information.

The article 300 and/or storage medium 302 may store contrast enhancement logic 304 comprising instructions, data, and/or code that, if executed by a machine, may cause the machine to perform a method and/or operations in accordance with the described embodiments. Such a machine may include, for example, any suitable processing platform, computing platform, computing device, processing device, computing system, processing system, computer, processor, or the like, and may be implemented using any suitable combination of hardware and/or software.

The contrast enhancement logic 304 may comprise, or be implemented as, software, a software module, an application, a program, a subroutine, instructions, an instruction set, computing code, words, values, symbols or combination thereof. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Figure 4:
FIGS. 4-7 illustrate image processing in accordance with one or more embodiments.
Figure 4:

FIG. 4 illustrates image processing in accordance with one or more embodiments. As shown, contrast enhancement may be realized between an original dark image (A) and a processed image (B). The embodiments are not limited in this context.

Figure 5:
Figure 5:

FIG. 5 illustrates image processing in accordance with one or more embodiments. As shown, contrast enhancement may be realized between an original bright image (A) and a processed image (B). The embodiments are not limited in this context.

Figure 6:
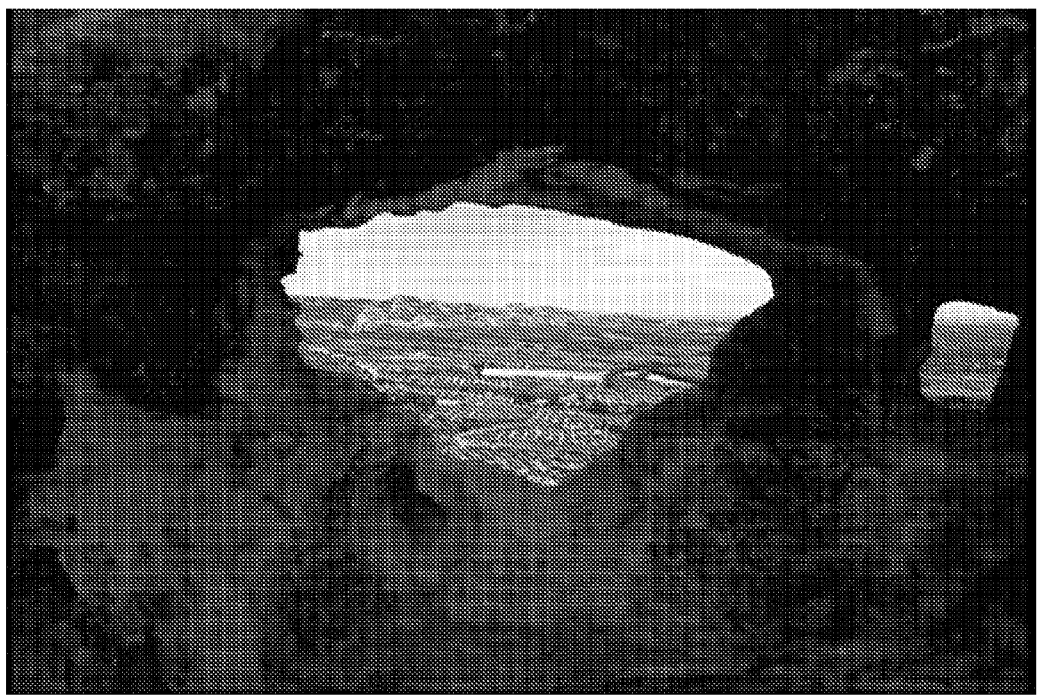
Figure 6:
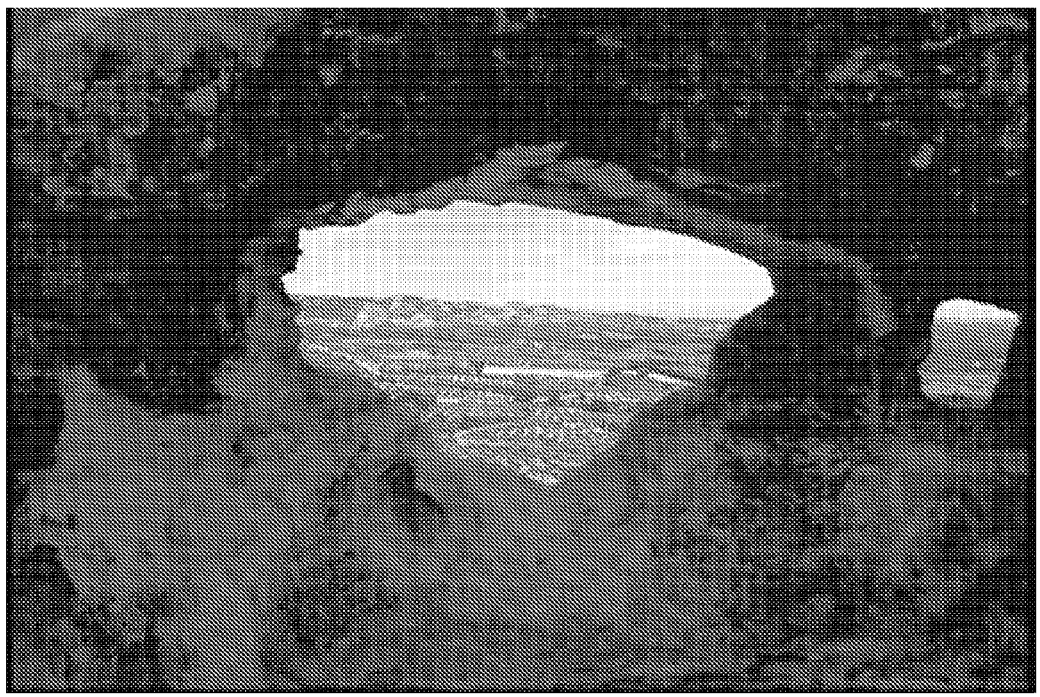

FIG. 6 illustrates image processing in accordance with one or more embodiments. As shown, contrast enhancement may be realized between an original shadowed image (A) and a processed image (B). The embodiments are not limited in this context.

Figure 7:
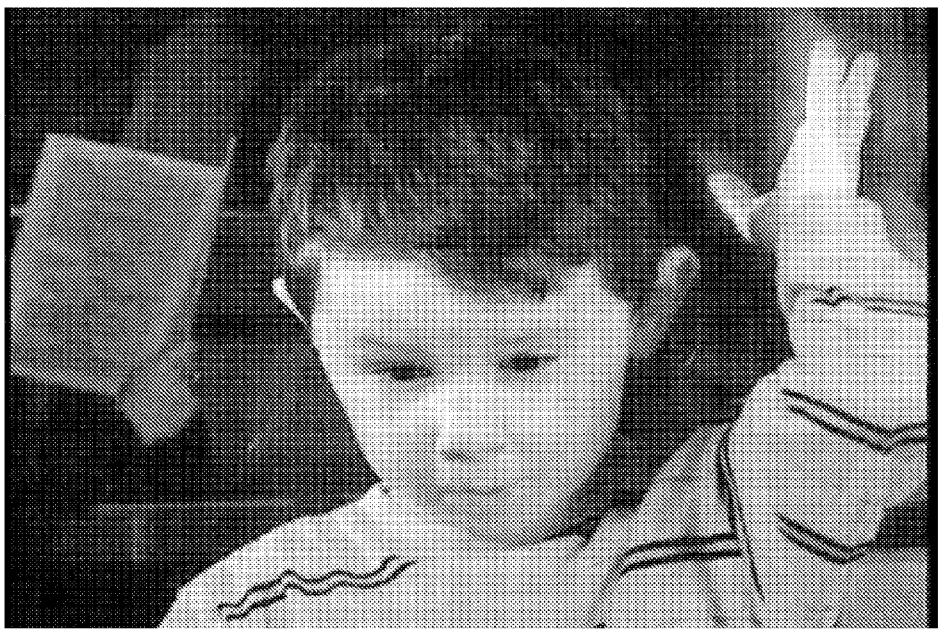
Figure 7:
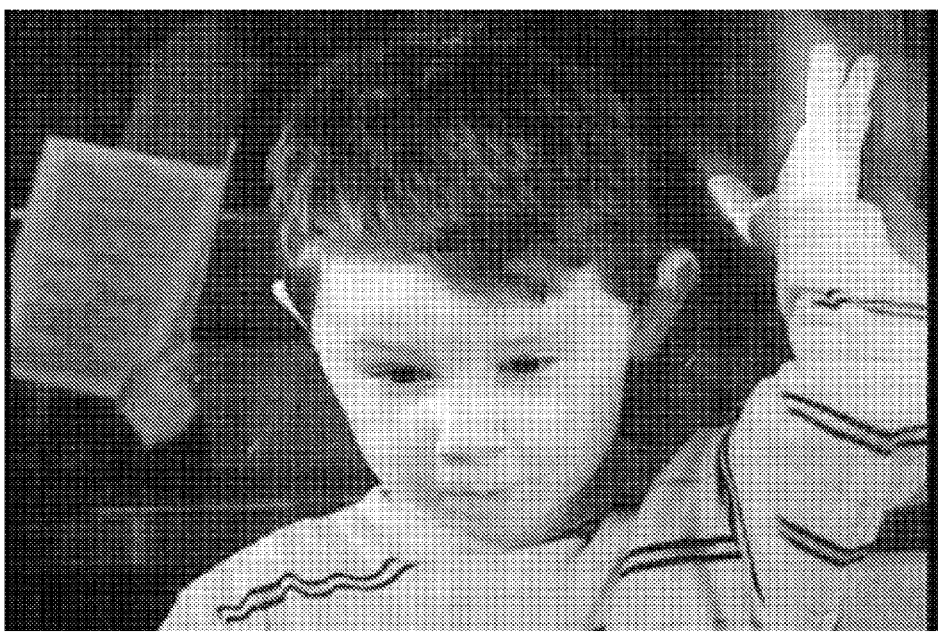

FIG. 7 illustrates image processing in accordance with one or more embodiments. As shown, contrast enhancement may be realized between an original noisy image (A) and a processed image (B). The embodiments are not limited in this context.

As demonstrated, the described embodiments may provide significant advantages such as no noise overenhancement, no blackness, no image flickering, and strong enhancement capability for very dark and very bright images. Such advantages are not provided by conventional contrast enhancing algorithms.

Compared to some global contrast enhancement algorithms, the described embodiments take into account local information, such as local standard deviation. Whenever a neighborhood with small luminance variation is found, no contrast stretching is carried out for this neighborhood. For example, in a small black area, contrast enhancement is useless for this region. For some local contrast enhancement methods, they only use local information to do the contrast stretching and, as a result, luminance is not uniformly adjusted and blockness is generated. Compared to such local methods, the described embodiments use LSD to generate the population for global histogram equalization. As a result, the described embodiments also take global information into account.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
   a logic device;
   a luminance region grouping module operative on the logic device to receive an input image and to group luminance values of the input image into one of several luminance regions;
   a local standard deviation (LSD) calculation module operative on the logic device to calculate an LSD value for each pixel within each luminance region, each luminance region defining an LSD threshold; and
   an LSD comparison module operative on the logic device to determine whether a calculated LSD value is smaller than the LSD threshold and to exclude a pixel from histogram equalization if the calculated LSD value is smaller than the LSD threshold.

2. The apparatus of claim 1, further comprising a lookup table to store population information for luminance value mapping.

3. The apparatus of claim 2, the lookup table comprising a first array generated when the lookup table is built.

4. The apparatus of claim 3, the first array comprising a 16-entry array.

5. The apparatus of claim 3, the lookup table comprising a second array generated by interpolating the first array.

6. The apparatus of claim 5, the second array comprising a 256-entry array.

7. The apparatus of claim 2, further comprising a luminance value mapping module to assign new luminance values to the input image using the lookup table.

8. A system, comprising:
   a media source;
   a contrast enhancement apparatus to couple to the media source, the contrast enhancement apparatus comprising:
      a luminance region grouping module to receive an input image and to group luminance values of the input image into one of several luminance regions;
      a local standard deviation (LSD) calculation module to calculate an LSD value for each pixel within each luminance region, each luminance region defining an LSD threshold; and
      an LSD comparison module to determine whether a calculated LSD value is smaller than the LSD threshold and to exclude a pixel from histogram equalization if the calculated LSD value is smaller than the LSD threshold.

9. The system of claim 8, further comprising a lookup table to store population information for luminance value mapping.

10. The system of claim 9, the lookup table comprising a first array generated when the lookup table is built.

11. The system of claim 10, the first array comprising a 16-entry array.

12. The system of claim 10, the lookup table comprising a second array generated by interpolating the first array.

13. The system of claim 12, the second array comprising a 256-entry array.

14. The system of claim 9, further comprising a luminance value mapping module to assign new luminance values to the input image using the lookup table.

15. A method, comprising:
    receiving an input image;
    grouping luminance values of the input image into one of several luminance regions;
    calculating a local standard deviation (LSD) for each pixel within each luminance region, each luminance region defining an LSD threshold;
    determining whether a calculated LSD value is smaller than the LSD threshold; and
    excluding a pixel from histogram equalization if the calculated LSD value is smaller than the LSD threshold.

16. The method of claim 15, further comprising storing population information in a lookup table for luminance value mapping.

17. The method of claim 16, further comprising generating a first array in the lookup table.

18. The method of claim 17, the first array comprising a 16-entry array.

19. The method of claim 17, further comprising interpolating the first array to generate a second array.

20. The method of claim 19, the second array comprising a 256-entry array.

21. The method of claim 16, further comprising assigning new luminance values to the input image using the lookup table.

22. An article comprising a computer-readable non-transitory storage medium containing instructions that if executed enable a system to:
    receive an input image;
    group luminance values of the input image into one of several luminance regions;
    calculate a local standard deviation (LSD) for each pixel within each luminance region, each luminance region defining an LSD threshold;
    determine whether a calculated LSD value is smaller than the LSD threshold; and
    exclude a pixel from histogram equalization if the calculated LSD value is smaller than the LSD threshold.

23. The article of claim 22, further comprising instructions that if executed enable the system to store population information in a lookup table for luminance value mapping.

24. The article of claim 23, further comprising instructions that if executed enable the system to generate a first array in the lookup table.

25. The article of claim 24, the first array comprising a 16-entry array.

26. The article of claim 24, further comprising instructions that if executed enable the system to interpolate the first array to generate a second array.

27. The article of claim 26, the second array comprising a 256-entry array.

28. The article of claim 23, further comprising instructions that if executed enable the system to assign new luminance values to the input image using the lookup table.

* * * * *